July 24, 1923.

A. SEQUEIRA

RESILIENT WHEEL

Filed July 22, 1922

Inventor
Abel Sequeira,
By H. C. Woodward
Attorney

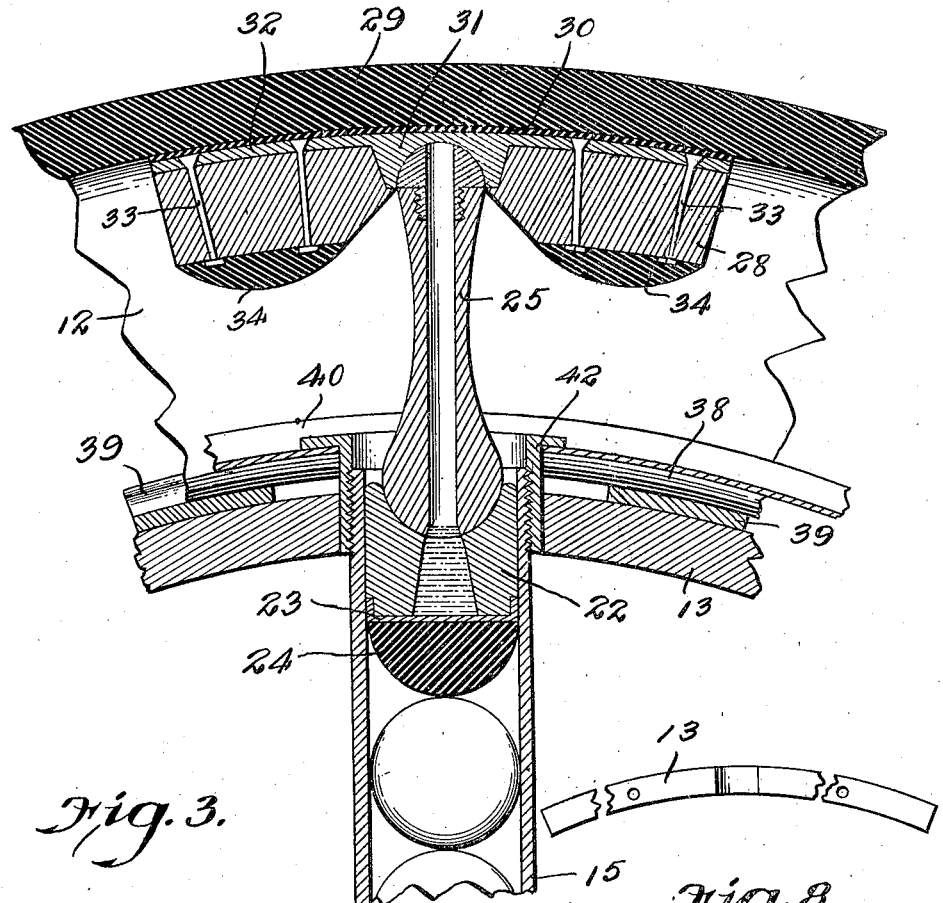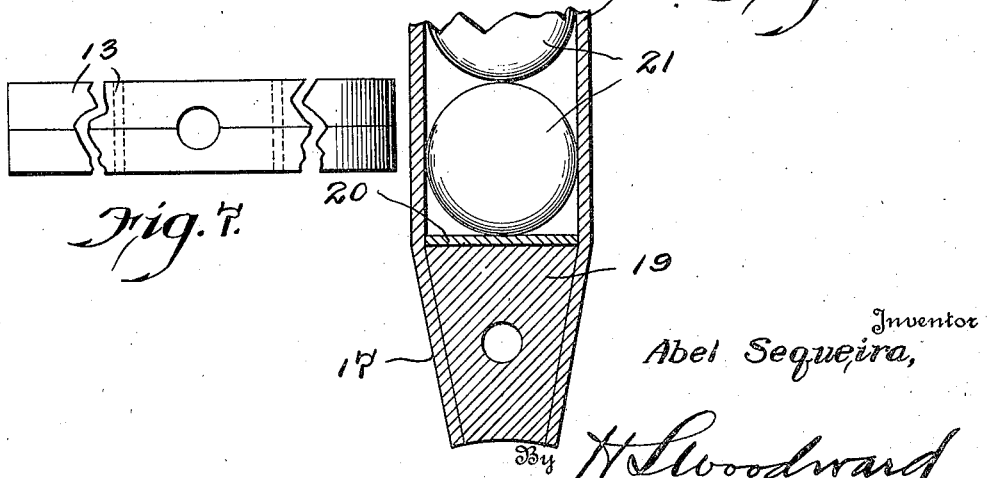

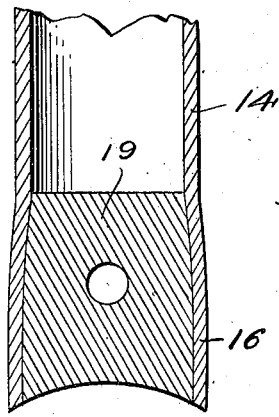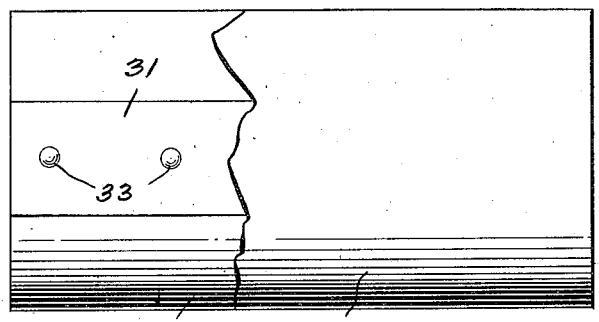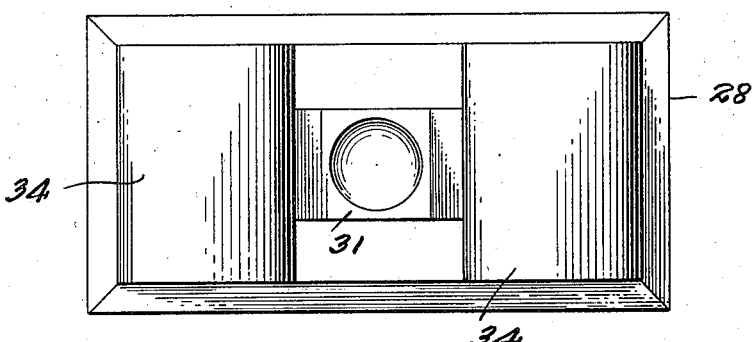

Patented July 24, 1923.

1,463,064

UNITED STATES PATENT OFFICE.

ABEL SEQUEIRA, OF NEW BEDFORD, MASSACHUSETTS.

RESILIENT WHEEL.

Application filed July 22, 1922. Serial No. 576,696.

*To all whom it may concern:*

Be it known that I, ABEL SEQUEIRA, a citizen of the Republic of Portugal, residing at New Bedford, in the county of Bristol and State of Massachusetts, have invented certain new and useful Improvements in Resilient Wheels, of which the following is a specification.

The invention has for an object to effect improvements in the method of and means for securing fabric shoe elements such as are used in pneumatic tires, upon a spring mounting, doing away with the use of the inflated inner tube. A further important object of my invention is to improve details of construction of the parts in spring wheels of this type, whereby they may be readily manufactured and assembled, and whereby they may function efficiently.

A further important aim of the invention is to provide novel details of construction in the mounting of shoe segments upon compressible spoke elements. A further aim is to present an improved construction in devices for clamping tires in place. Other objects, advantages and features of invention are involved in the particular structure, combination and arrangement of parts involved, as may be understood from the following description and in the drawings of my invention, wherein, Figure 1 is an elevational view of a wheel, Fig. 2 is an enlarged cross sectional view of the tire element and immediate mounting, Fig. 3 is a fragmentary section in the major plane of the wheel, representing one form of spoke, complete, Fig. 4 is a fragmentary sectional view of the inner end of another spoke in the same plane as Fig. 3.

Fig. 5 is a detail plan view of one of the shoe elements as viewed from the outer side.

Fig. 6 is a similar view at the inner side of the segment.

Figures 7 and 8 are peripheral and elevational views of felly sections.

Figure 1:
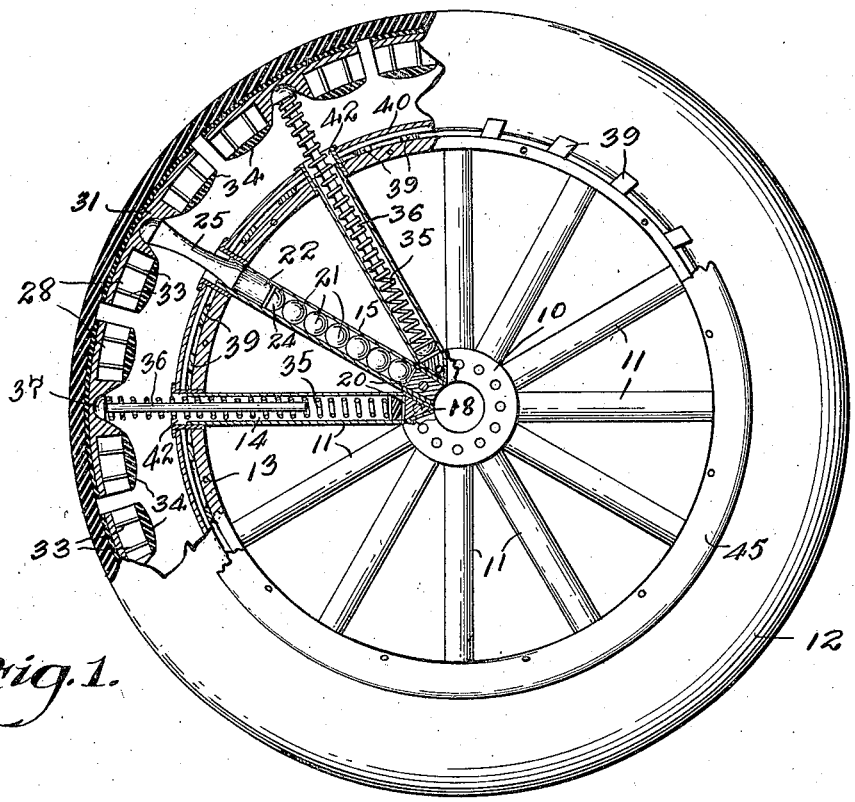
Figure 2:
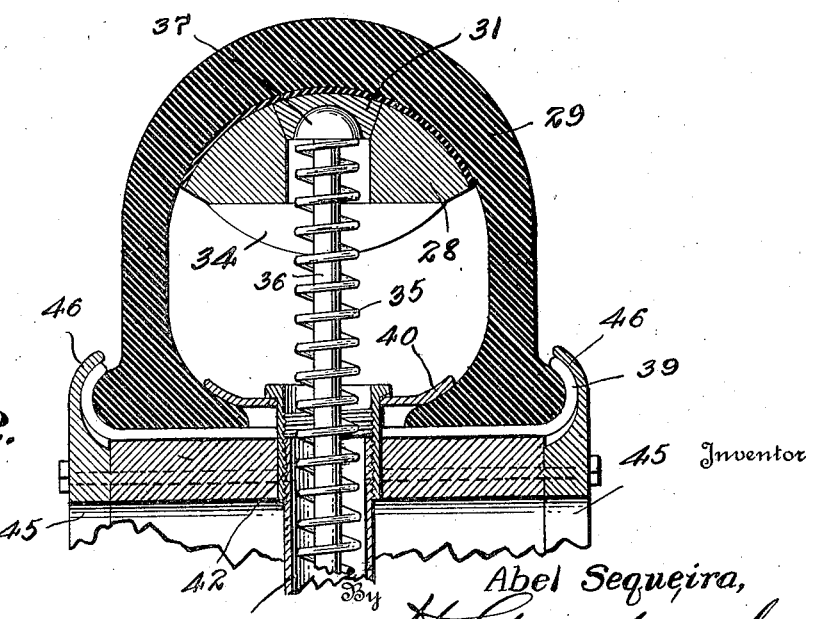

My wheel construction as shown in Fig. 1 includes a hub 10, which may be of a construction similar to that employed in ordinary wooden automoblie wheels; spokes 11 being mounted upon the hub by which a tire element 12 and felly 13 are mounted. The felly ring is not secured directly to the spokes, however, as in ordinary wheels, as will appear hereinafter, although the felly has no movement relatively to the spoke elements 11. The spokes are all of similar appearance exteriorly, but interiorly, there are two general types involved, one a resilient load carrying structure having that function principally, and alternately of such spokes, there are constructions adapted to support a load resiliently, and also at the same time transmit torque from the inner part of the wheel to the shoe element for traction, or otherwise, as necessary. The alternate spoke shells or body elements 14 and 15 are distinguished from each other in their butt formation, adjacent the hub, one being formed with broad butt ends as at 16, while the other is formed with the usual tapered butt 17, the ends of all being fitted to a cylindrical opening 18 which may fit snugly upon a hub barrel or the like as may be required. The spoke bodies are formed of any suitable material, and may be drawn or otherwise formed as found most expedient. Preferably, the butt ends have a block of hard wood or other material 19 snugly enclosed therein so that the butt may be clamped between the flanges of a hub in the manner familiar in artillery wheels. The butts are also shown transversely apertured, so that bolts or other fastenings may be engaged therethrough. In one set of spokes, upon a metal washer 20 set against the block 19, there are disposed a series of balls 21 each fitted slidably in the spoke, all arranged longitudinally in close contact, and formed of a resilient material such as rubber. At the outer part of each of such spokes there is disposed slidably therein a block 22 having a conical opening therethrough with the larger end presented toward the hub of the wheel, the block resting upon a washer 23 which is supported by a semi-spherical cushion element 24 formed of half of a ball such as those 21. The block 22 is formed with a spherical seat at the outer end receiving the inner spherical-shaped end of a stem 25. Upon each of the stems 25, there are set shoe segments 28 having ball and socket mounting on the stems. The shoe segment is of a shape to fit snugly against the inner surface of the tire shoe 29 when in proper form, and is faced with rubber as at 30 in order to cushion its support of the shoe 29. The segment 28 has a longitudinal channel formed in the outer face and is centrally apertured, receiving a socket member 31 of a metal rib piece 32 which is set in the longitudinal channel of the segment and secured to the segment by bolts 33. The surfaces of the segments 28 are inclined away from the socket member 31 at the inner side, so as to give ample room for oscillation of the segments upon the stems 25. At each end, upon the inner face toward the hub of the wheel, each segment 28 is provided with a thick rubber cushion 34.

Alternated with the spokes having the balls 21 therein are spokes in which there are mounted springs 35, seated against the washer 20 at the inner end, and projected outwardly from the spokes radially, a stem element 36 being engaged slidably therein having a head portion 37 supported by the spring and borne into the socket element 31 of a respective shoe segment 28. The tire shoe 29 is engaged snugly over the segments 28, which are arranged therein in close relation as before mentioned, the shoe 29 in the present instance being of the clincher type ordinarily used with pneumatic tires. The bead 38 of the shoe 29 is engaged at frequent intervals by transverse yokes 39, which have the form of the cross section of a clincher rim in ordinary motor vehicle wheels, so that their ends may be hooked over the bead 38 to hold the beads confined in proper relative relation. There are at least two yokes between each two spokes. The felly ring 13 is of a size to fit snugly against the yokes 39 but permitting free removal and replacement of the shoe 29 when the yokes are engaged therewith. Within the shoe 29 there is disposed an annular retainer or clamping ring 40, which is provided with openings corresponding in number to the number of spokes, and adapted to be alined therewith. Set loosely in these openings there are interiorly threaded sleeves 42, which are flanged at their inner ends so that when drawn outwardly the flanges will bear adjacent parts of the ring 40 outwardly and against the edge portions of the shoe 29, bearing them toward the yokes 39 so that the shoe will be securely retained. The outer ends of the spokes are exteriorly threaded and arranged to receive the sleeves 42 thereon, the screwing of the sleeves 42 on to the spoke ends serving to clamp the ring 40 securely against the edges of the shoe 29 bearing the same toward the wheel center, and also compressing the yokes 39 against the felly ring, which is thereby held securely in place and utilized to stiffen the outer parts of the wheel, holding the operative parts in proper spaced relation.

To facilitate assembly and to give the wheel a simple and compact appearance when assembled, the sleeves 42 may be made of such length that they do not project through the felly ring, and the latter is made in four parts or more, as desired, one set at each side, the two sets meeting on the medial plane of the wheel, (see Figs. 7 and 8) and recessed to receive the sleeves 42 snugly, in such case. The felly sections are put in place after assembly of the remainder of the parts. A ring 45 is also provided, at each side, which is secured to the felly, extending outwardly therefrom, and being formed with a curved flange 46 which engages outwardly of the ends of the members 39 to retain the latter securely in place.

In the use of the device, the shoe elements 29 will have free universal pivot movement upon the respective spoke mechanisms, so that they may rock freely in all directions, to present the greatest surface against the roadway. In the event that severe compression of the shoe 29 is occasioned, as when striking a stone, log, or other obstruction, if the force of engagement is sufficient to compress the shoe 29 beyond the predetermined normal limit of action, the cushion 34 will engage upon the clamp ring 40 checking further compression, jar or damage, as will be readily understood. The conical opening in the block 22 and the passage in the hollow stem 25 are preferably filled with a suitable lubricant, such as oil or grease, or any other suitable substance, so that the bearings between the socket members 19 and 31 and the stems 25 will be suitably lubricated. Lubricant is also preferably introduced in the spokes having the springs 35 therein, as required. The rods 36 will serve to transmit torque of traction to the tire parts from the hub and spokes.

In the assembly of the wheel, it is necessary to introduce the ring 40 and the sleeve 42 assembled therein into the tire shoe 29, as well as the shoe segments 28, which are introduced into the tire shoe outwardly of the ring 40. The yokes 39 are then applied to the shoe 29. The sleeves 42 are then thrust inwardly and the spokes severally and respectively engaged therewith and then adjusted in the position shown in Fig. 1. After this they may be clamped in the hub in the usual manner and securely bolted as required. The sleeves 42 may be then operated to securely clamp the ring 40 and also to center the ring 40 with respect to the hub so as to bring all of the parts into proper concentric relation. The felly ring is then applied, and the ring 45 secured as above described.

It will be seen that a wheel of comparatively simple construction is provided adapted to function and maintain a tire shoe 29 in proper form and cushion shocks sustained thereby without requiring the use of a pneumatic tube, and which is adapted to ready manufacture assemblage and replacement of parts.

What is claimed:—

1. In a wheel of the character described, an exteriorly threaded spoke tube, a felly element, means to engage laterally outwardly of the edges of tire shoes of the general character indicated, an interiorly threaded sleeve adapted to screw upon the spoke tube and enlarged at its outer part, and a shoe retaining member apertured and receiving the sleeve therein for confinement by the enlargement, and resilient shoe load sustaining means operative on the spokes.

2. In a wheel of the character indicated, a spoke tube, a resilient element therein a semi-spherical bearing member supported thereby, a shoe segment having a corresponding socket receiving the bearing member, said segment having an exterior cushion facing, and having stop cushions at the inner part at opposite sides of the socket, and a member fixed with respect to the wheel axis disposed to be engaged by the stop cushions when the segment is compressed beyond the normal maximum.

In testimony whereof I have affixed my signature in presence of two witnesses.

ABEL SEQUEIRA.

Witnesses:
 ALFRED J. TACHECO,
 WILLIAM J. MURRAY.